(12) United States Patent
Cho et al.

(10) Patent No.: US 11,001,517 B2
(45) Date of Patent: *May 11, 2021

(54) BIOREACTOR FOR TREATING SEWAGE AND SEWAGE TREATMENT SYSTEM COMPRISING THE SAME

(71) Applicant: DOOSAN HEAVY INDUSTRIES & CONSTRUCTION CO., LTD., Changwon-si (KR)

(72) Inventors: Hwan Chul Cho, Seoul (KR); Seong Ju Kim, Jinju-si (KR); Yang Oh Jin, Gyeonggi-do (KR); Chul Woo Lee, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,994

(22) Filed: Nov. 5, 2019

(65) Prior Publication Data

US 2020/0062628 A1    Feb. 27, 2020

Related U.S. Application Data

(63) Continuation of application No. 15/953,390, filed on Apr. 13, 2018, now Pat. No. 10,494,282.

(30) Foreign Application Priority Data

Apr. 18, 2017 (KR) .......................... 10-2017-0049523
Jun. 26, 2017 (KR) .......................... 10-2017-0080508

(51) Int. Cl.
*C02F 9/00* (2006.01)
*C02F 3/30* (2006.01)
(Continued)

(52) U.S. Cl.
CPC ................ *C02F 9/00* (2013.01); *C02F 1/001* (2013.01); *C02F 3/302* (2013.01); *C02F 3/307* (2013.01);
(Continued)

(58) Field of Classification Search
CPC .. C02F 9/00; C02F 3/302; C02F 1/001; C02F 3/307; C02F 2201/006; C02F 2101/16;
(Continued)

(56) References Cited

U.S. PATENT DOCUMENTS 3,546,110 A * 12/1970 Garner .................. C02F 3/1242
210/625
4,179,374 A    12/1979 Savage et al.
(Continued)

FOREIGN PATENT DOCUMENTS

EP          0225965 A2    6/1987
JP       60-206494 A  * 10/1985
(Continued)

OTHER PUBLICATIONS

Guoqiang Liu., Nitrification performance of activated sludge (2012).
Ministry of Environment, Sewerage Facility Standard, 2011.

*Primary Examiner* — Fred Prince
(74) *Attorney, Agent, or Firm* — Invenstone Patent, LLC

(57) ABSTRACT

Disclosed is a bioreactor for treating sewage comprising an aerobic tank including a mixing cell for receiving sewage to be supplied from an inlet and mixing the sewage with activated sludge and an aerobic reactor tank in which the activated sludge adsorbs organic substance existing in the sewage; a backwashing cartridge filter for removing floc resulting from growth of the activated sludge adsorbing the organic substance; and an anaerobic tank for carrying out a denitrification process for denitrifying treated water flowed through the backwashing cartridge filter using anaerobic (Continued)

ammonium oxidation (anammox) bacteria wherein the back-washing cartridge filter allows the sewage discharged from the aerobic tank to pass through the cartridge filter and separates the floc and the treated water using difference in size between the floc contained in the sewage and pores in the cartridge filter, and wherein foreign matter adsorbed on the cartridge filter is easily removed by means of washing water to be injected into the cartridge filter.

19 Claims, 5 Drawing Sheets

(51) Int. Cl.
| | | |
|---|---|---|
| *C02F 1/00* | (2006.01) | |
| *C02F 3/28* | (2006.01) | |
| *C02F 3/34* | (2006.01) | |
| *C02F 11/04* | (2006.01) | |
| *C02F 11/12* | (2019.01) | |
| *C02F 3/20* | (2006.01) | |
| *C02F 11/121* | (2019.01) | |
| *C02F 101/16* | (2006.01) | |
| *C02F 101/38* | (2006.01) | |

(52) U.S. Cl.
CPC ............... *C02F 1/004* (2013.01); *C02F 3/20* (2013.01); *C02F 3/282* (2013.01); *C02F 3/305* (2013.01); *C02F 3/34* (2013.01); *C02F 11/04* (2013.01); *C02F 11/121* (2013.01); *C02F 2001/007* (2013.01); *C02F 2101/16* (2013.01); *C02F 2101/38* (2013.01); *C02F 2201/006* (2013.01); *C02F 2303/16* (2013.01)

(58) Field of Classification Search
CPC ............ C02F 2101/38; C02F 2001/007; C02F 2303/16; C02F 3/305; C02F 1/004; C02F 3/282; C02F 3/34; C02F 11/04; C02F 11/121; C02F 3/20
USPC .... 210/605, 620, 621, 622, 623, 630, 221.1, 210/221.2, 903, 603
See application file for complete search history.

(56) References Cited

U.S. PATENT DOCUMENTS

| | | | | |
|---|---|---|---|---|
| 4,487,697 | A | * 12/1984 | Bohnke | C02F 3/04 210/605 |
| 7,462,284 | B2 | 12/2008 | Schreier et al. | |
| 2003/0142301 | A1 | * 7/2003 | Coleman | G01N 21/65 356/301 |
| 2005/0211629 | A1 | * 9/2005 | Isaka | C02F 3/302 210/621 |
| 2008/0073268 | A1 | * 3/2008 | Cort | B03C 1/286 210/609 |
| 2008/0223783 | A1 | * 9/2008 | Sutton | C02F 3/1273 210/621 |
| 2010/0282673 | A1 | * 11/2010 | Ogawa | G21F 9/06 210/610 |
| 2011/0247985 | A1 | * 10/2011 | Theodore | C02F 1/66 210/720 |
| 2013/0264280 | A1 | | 10/2013 | Zhao et al. |
| 2014/0083936 | A1 | | 3/2014 | Murthy et al. |
| 2014/0305867 | A1 | | 10/2014 | Nyhuis |
| 2016/0130164 | A1 | | 5/2016 | Whittier et al. |

FOREIGN PATENT DOCUMENTS

| | | |
|---|---|---|
| JP | 2006-281003 A | 10/2006 |
| JP | 2015-128747 A1 | 7/2015 |
| KR | 10-2002-0083267 A | 11/2002 |
| KR | 10-1430722 B1 | 8/2014 |
| KR | 10-2014-0124319 A | 10/2014 |
| KR | 10-2015-0096647 A1 | 8/2015 |

* cited by examiner

[FIG. 1]
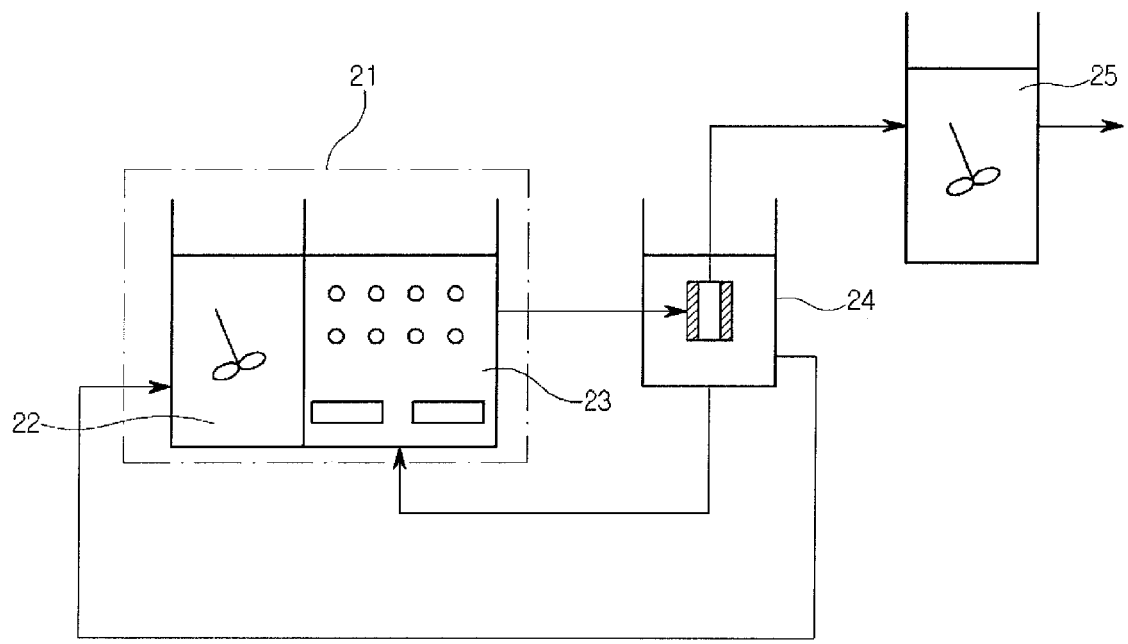

[FIG. 2]
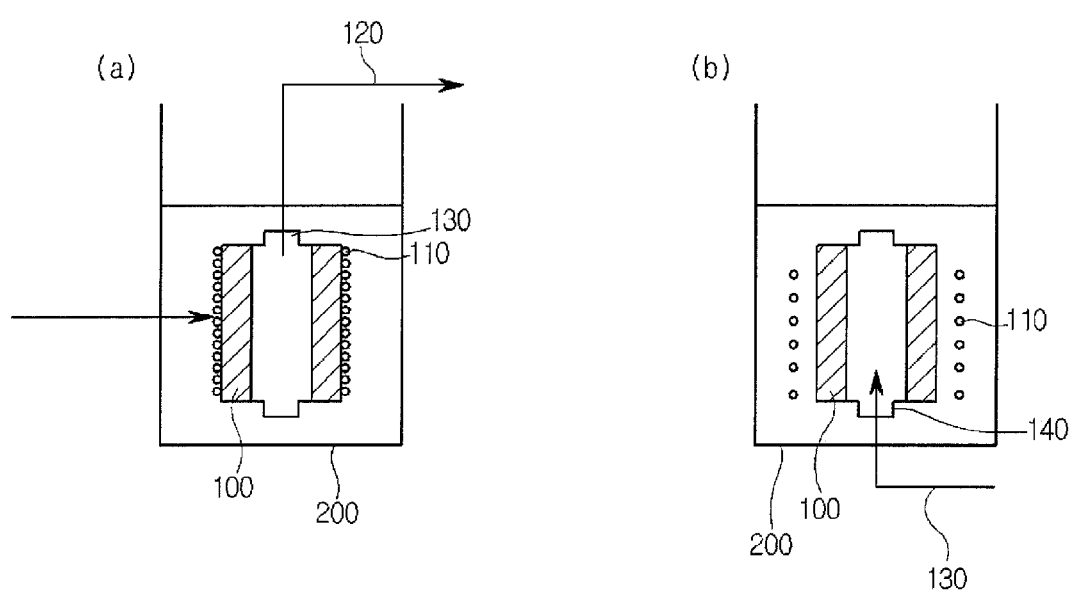

[FIG. 3]
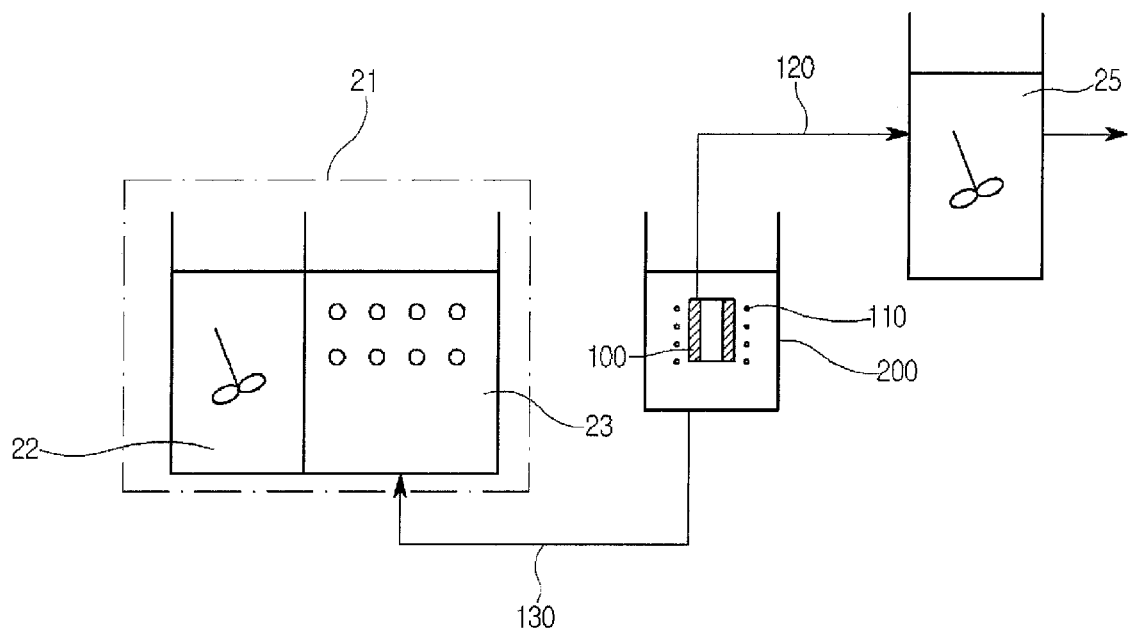

[FIG. 4]
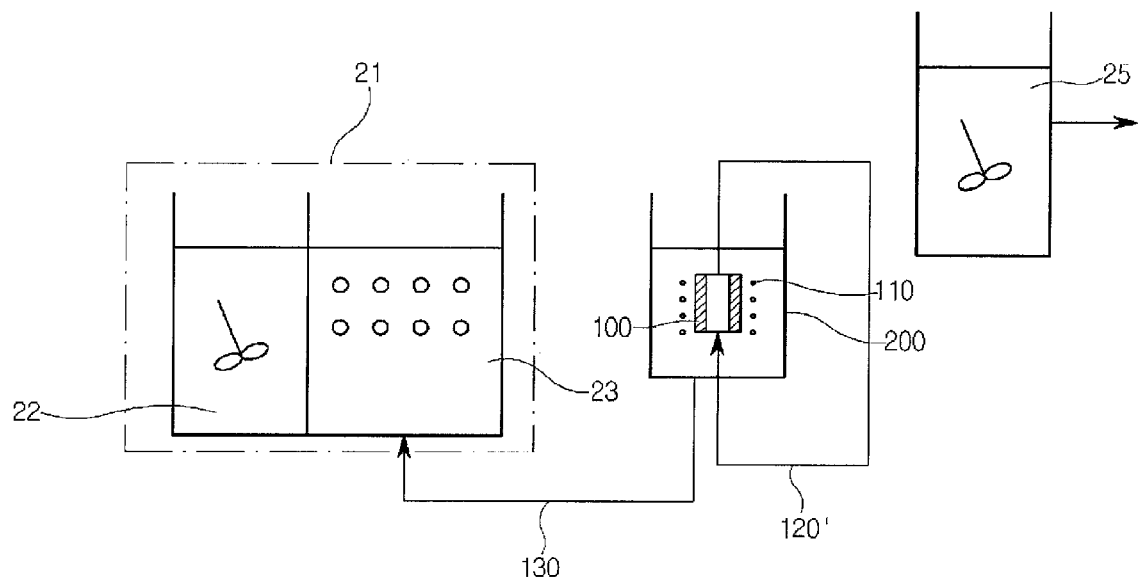

[FIG.5]
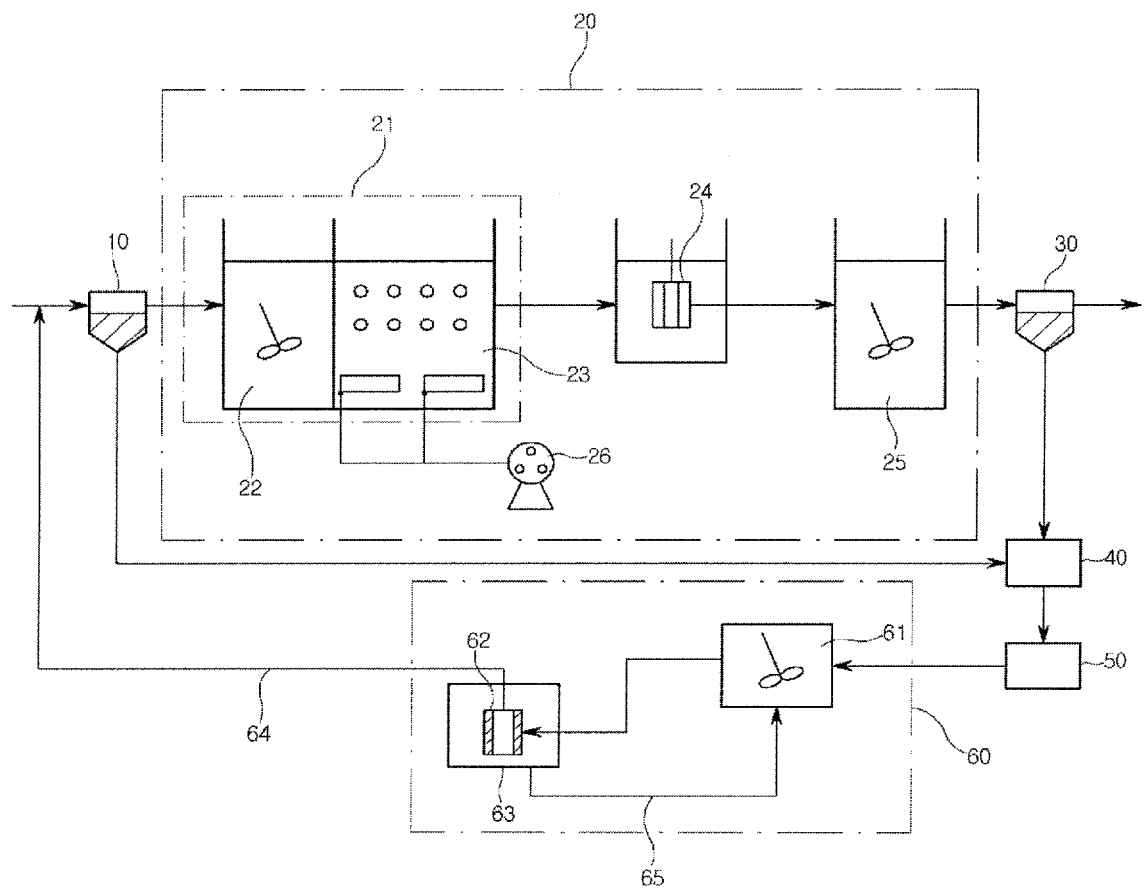

BIOREACTOR FOR TREATING SEWAGE AND SEWAGE TREATMENT SYSTEM COMPRISING THE SAME

CROSS-REFERENCE TO RELATED APPLICATIONS

This application is a continuation of U.S. application Ser. No. 15/953,390, filed on Apr. 13, 2018, which claims benefit of priority to Korean Patent Application Nos. 10-2017-0080508 filed on Jun. 26, 2017 and 10-2017-0049523 filed on Apr. 18, 2017 in the Korean Intellectual Property Office, the disclosure of which is incorporated herein by reference in its entirety.

BACKGROUND OF THE DISCLOSURE

Field of the Disclosure

The present disclosure relates to a bioreactor for treating sewage and a sewage treatment system comprising the same and more particularly, to a bioreactor and a sewage treatment system comprising the bioreactor, which have a simple structure, are excellent in treatment efficiency, and are utilized in treating sewage, food wastes, or livestock wastes.

Description of the Related Art

Conventional sewage treatment facilities often utilize a standard activated sludge process or a process to which the above process is added or in which the above process is modified. Further, in some countries, A2/O process, UCT process, VIP process, or the like are used in the sewage treatment facilities. The processes used in those countries as mentioned above are not applicable to a confluent type sewage exclusion system in other countries. The A2/O process is a process for removing nitrogen and phosphorus, in which an A/O process is improved with a biological treatment process wherein a reactor comprises an anaerobic tank, anoxic tank and an aerobic tank and is configured to carry out a nitrified recycle process for removing nitrate nitrogen and a process for returning activated sludge from a clarifier. The anaerobic tank serves to release phosphorus under anaerobic conditions such that microorganisms can ingest nutritions excessively in the aerobic tank. The anaerobic tank serves to remove nitrogen and phosphorus by denitrifying nitrate in the internal return water of the aerobic tank.

The A2/O process removes nitrogen and phosphorus in sewage to reduce nutrients in the sewage. However, this process has problems in that it focuses on only removal of nitrogen and phosphorus in the sewage, but bacteria and microorganisms in the sewage, which recently come to the front as being harmful to the human body, may not be removed in the process.

Almost majority of conventional sewage treatment plants are operated through a biological treatment method using a way of decomposing contaminants by microorganisms. The biological treatment method has been proved for a long time as having good performance and being the most effective and safe method. However, it has a problem in that surplus sludge may occur.

Most surplus sludge causes a treatment problem because it is organic substance that is microbial mass and hence easy to decay. Heretofore, treatment of the surplus sludge has mainly relied on marine dumping and partly on reclamation or incineration. The amount of surplus sludge generated as of 2012 is more than 10,000 tons per day, which becomes more than 3.65 million tons of sludge per year. The surplus sludge is expected to increase continually in the future.

As a treatment for the surplus sludge, marine dumping has been banned since 2012, and a policy for promotion of conversion of organic wastes into new and renewable energy, such as conversion of wastes into resources and energy and reduction of wastes, has been carried out. Particularly, in the sludge treatment by means of an anaerobic digestion tank, a pre-treatment process for solubilization is carried out in order to increase treatment efficiency. Examples of the pre-treatment technology include a biological approach using thermophilic aerobic microorganisms, a physical approach using ultrasonic waves, hydrodynamic cavitation, thermal hydrolysis, or a ball mill apparatus, a chemical approach using ozone treatment and alkali chemical treatment, a combined treatment approach in which a plurality of treatment methods as mentioned are combined, and an electric approach using electrolysis. However, these approaches have a problem in that costs therefor are high or reduction efficiency is low, and thus it is difficult to put them to practical use.

Korean Patent No. 10-135458 discloses a method of solubilizing sludge for increasing digestion efficiency of an anaerobic digestion tank, where surplus sludge generated in the process of treating wastewater is treated with alkali catalyst and methanol to soften or destroy cell membranes of biodegradable microorganisms in the sludge so that the anaerobic digestion efficiency can be enhanced by anaerobic microorganisms in the digestion tank.

SUMMARY OF THE DISCLOSURE

It is an object of the present disclosure to provide a bioreactor for treating sewage which is of a simple structure so that plottage area therefor can be minimized and which is excellent in solid-liquid separation efficiency after agglomeration of organic substance so that the amount of sludge generated and the time of treatment are reduced.

It is another object of the present disclosure is to provide a sewage treatment system comprising a bioreactor according to the present disclosure, which is capable of reducing the amount of by-product generated and the treatment time while minimizing the plottage area for the system through the simple structure of the bioreactor and which is capable of producing and recovering biogas.

Other objects and advantages of the present disclosure will be more apparent from the following detailed description of the disclosure, claims and drawings.

Embodiments of the present disclosure are provided to explain the present disclosure more fully to those skilled in the art. The embodiments described below may be modified into various other forms and the scope of the present disclosure is not limited to the embodiments described below. Rather, these embodiments are provided to make this disclosure thorough and complete and fully convey the spirit of the present disclosure to those skilled in the art.

In the drawings, thickness or size of each layer are assumed for convenience and clarity of description and the same reference numerals are used to refer to the same components. The term "and/or" as used herein includes all combinations of any one or one or more of items listed in the corresponding sentence.

Terms as used herein are intended to describe a specific embodiment but not limit the present disclosure. As used herein, the singular form may include the plural form unless the context clearly indicates otherwise. Also, terms "comprise" and/or "comprising" as used herein are intended to specify the presence of configurations, integers, steps, operations, members, elements and/or groups thereof but not exclude the presence or addition of one or more other configurations, integers, operations, members, elements and/or groups thereof.

In accordance one aspect of the present disclosure, a bioreactor for treating sewage comprises an aerobic tank including an inlet for supplying sewage, a mixing cell for receiving the sewage and mixing the sewage with activated sludge, an aerobic reactor tank continuously coupled to the mixing cell, in which the activated sludge adsorbs organic substance, and an outlet for discharging sewage containing organic substance adsorbed on the activated sludge in the aerobic reactor tank; a backwashing cartridge filter for removing floc resulting from growth of the activated sludge adsorbing the organic substance from the sewage discharged through the outlet of the aerobic tank; and an anaerobic tank for carrying out a denitrification process for denitrifying treated water having been passed through the backwashing cartridge filter, using anaerobic ammonium oxidation (anammox) bacteria wherein the backwashing cartridge filter allows the sewage discharged from the aerobic tank to pass through the cartridge filter and separates the floc and the treated water, using difference in size between the floc contained in the sewage and pores in the cartridge filter and wherein foreign matter adsorbed on the cartridge filter is easily removed by means of washing water to be injected into the cartridge filter.

According to an embodiment of the present disclosure, the backwashing cartridge filter of the present disclosure may comprise a cartridge filter housing; a cartridge filter fixedly installed inside the cartridge filter housing to separate the floc and the treated water; a transfer port arranged at an upper end of the cartridge filter to allow the treated water having been passed through the cartridge filter to be discharged therethrough; and an inlet arranged at a lower end of the cartridge filter to allow the washing water for removing the floc not having been passed through the cartridge filter to be introduced therethrough. According to an embodiment of the present disclosure, the cartridge filter of the present disclosure may comprise a large number of pores having a diameter of 50 to 150 μm.

According to an embodiment of the present disclosure, the backwashing cartridge filter of the present disclosure may further comprise a sludge supply piping for transferring the separated floc to the aerobic tank.

According to an embodiment of the present disclosure, the activated sludge of the present disclosure may comprise at least one selected from the group consisting of ammonia-oxidizing archaea (AOA), ammonia-oxidizing bacteria (AOB) and nitrite-oxidizing bacteria (NOB).

According to an embodiment of the present disclosure, the aerobic reactor tank of the present disclosure may further comprise an air injection unit for injecting air.

In accordance with another aspect of the present disclosure, there is provided a sewage treatment system comprising a primary sedimentation tank for sedimenting sewage containing sludge to separate the sewage into raw sludge and settled sewage water; a bioreactor according to claim 1 for allowing organic substance in the sewage separated in the primary sedimentation tank to be adsorbed on activated sludge such that the organic substance is separated out of the sewage and carrying out a denitrification process; a secondary sedimentation tank for sedimenting surplus sludge in the sewage having adsorbed the organic substance in an aerobic tank of the bioreactor; a dehydration tank for dehydrating the raw sludge recovered by being sedimented in the primary sedimentation tank and the surplus sludge recovered by being sedimented in the secondary sedimentation tank; a digestion tank for anaerobically digesting the raw sludge and the surplus sludge dehydrated in the dehydration tank to produce biogas; and a sequential batch reactor (SBR) reaction tank for removing nitrogen by allowing supernatant containing ammonium generated in the digestion tank to react with anaerobic ammonium oxidation (anammox) bacteria.

According to an embodiment of the present disclosure, the bioreactor of the present disclosure may comprise a backwashing cartridge filter for removing floc resulting from growth of the activated sludge adsorbing organic substance.

According to an embodiment of the present disclosure, the backwashing cartridge filter of the present disclosure may comprise a cartridge filter housing; a cartridge filter fixedly installed inside the cartridge filter housing to separate the floc and the treated water; a transfer port arranged at an upper end of the cartridge filter to allow the treated water having been passed through the cartridge filter to be discharged therethrough; and an inlet arranged at a lower end of the cartridge filter to allow the washing water for removing the floc not having been passed through the cartridge filter to be introduced therethrough.

According to an embodiment of the present disclosure, the cartridge filter of the present disclosure may comprise a large number of pores having a diameter of 50 to 150μ.

According to an embodiment of the present disclosure, the activated sludge of the present disclosure may comprise at least one selected from the group consisting of ammonia-oxidizing archaea (AOA), ammonia-oxidizing bacteria (AOB) and nitrite-oxidizing bacteria (NOB).

According to an embodiment of the present disclosure, the bioreactor of the present disclosure may further comprise an air injection unit for injecting air to allow the organic substance in the sewage to be adsorbed on the activated sludge.

According to an embodiment of the present disclosure, the anaerobic ammonium oxidation (anammox) bacteria of the present disclosure is Planctomycetes.

According to an embodiment of the present disclosure, the anaerobic ammonium oxidation (anammox) bacteria of the present disclosure is Planctomycetes granules.

According to an embodiment of the present disclosure, the SBR reaction tank of the present disclosure may be connected to a treated water reservoir and the treated water reservoir may comprise a backwashing cartridge filter for selectively separating the activated sludge.

According to an embodiment of the present disclosure, the sewage treatment system may further comprise a biogas collector for collecting the biogas generated in the digestion tank of the present disclosure.

In accordance with still another aspect of the present disclosure, there is provided a method of treating sewage, comprising: 1) primarily sedimenting sewage containing sludge to separate the sewage into raw sludge and settled sewage water; 2) allowing organic substance in the settled sewage water separated in the primarily sedimenting sewage to be adsorbed on activated sludge such that the organic substance is separated out of the settled sewage water and carrying out a denitrification process; 3) subsequently to the step 2), secondarily sedimenting surplus sludge in the settled sewage water, on which the organic substance have been adsorbed, to separate the surplus sludge from treated sewage water; 4) recovering and discharging the treated sewage water from which the surplus sludge has been layer-separated by being sedimented in the secondarily sedimenting surplus sludge that is the step 3); 5) dehydrating the raw sludge recovered by being sedimented in the primarily sedimenting sewage that is the step 1) and the surplus sludge recovered by being sedimented in the secondarily sedimenting surplus sludge that is the step 3); 6) anaerobically digesting the raw sludge and the surplus sludge dehydrated in the step 5) to produce biogas; and 7) removing nitrogen by allowing supernatant containing ammonium generated in the step 6) to react with anaerobic ammonium oxidation (anammox) bacteria.

According to an embodiment of the present disclosure, the step 2) of the present disclosure is intended to allow the organic substance in the settled sewage water to be adsorbed on the activated sludge such that floc resulting from growth of the activated sludge adsorbing the organic substance is separated wherein a backwashing cartridge filter may be utilized in order to separate the floc.

According to an embodiment of the present disclosure, the activated sludge in the step 2) of the present disclosure may comprise at least one selected from the group consisting of ammonia-oxidizing archaea (AOA), ammonia-oxidizing bacteria (AOB) and nitrite-oxidizing bacteria (NOB).

According to an embodiment of the present disclosure, the anaerobic ammonium oxidation (anammox) bacteria in the step 7) of the present disclosure is Planctomycetes.

According to the bioreactor for treating sewage that is provided in the present disclosure, since a large amount of organic substance contained in the sewage is cohered in organic substance cohesion bodies and then solid-liquid separation is carried out with high efficiency by means of a backwash cartridge filter, treatment time may be shortened. In addition, since the activated sludge separated is recycled, sludge discharge amount may be significantly reduced. As a result, sewage treatment efficiency per unit area of plottage may be further enhanced while minimizing the area of plottage.

Furthermore, since the backwashing cartridge filter is utilized, it is possible to remove foreign matter adhered in the cartridge filter by injecting washing water to the cartridge filter without need to perform a separate washing process for removing the foreign matter adhered in the cartridge filter so that replacement frequency of the cartridge filter may be extended.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a schematic view illustrating a structure of a bioreactor for treating sewage according to an embodiment of the present disclosure;

FIG. 2 is a schematic view illustrating a structure of a backwashing cartridge filter according to an embodiment of the present disclosure;

FIG. 3 is a schematic view showing a flow in a bioreactor for treating sewage comprising a backwashing cartridge filter according to an embodiment of the present disclosure;

FIG. 4 is a schematic view showing a flow at the time of backwashing in a bioreactor for treating sewage comprising a backwashing cartridge filter according to an embodiment of the present disclosure; and FIG. 5 is a schematic view illustrating a structure of a sewage treatment system according to an embodiment of the present disclosure.

DESCRIPTION OF SPECIFIC EMBODIMENTS

Preferred embodiments of the present disclosure will now be described. However, the embodiments of the present disclosure can be modified into various other forms and the scope of the present disclosure is not limited to the embodiments described below. Further, the embodiments of the present disclosure are provided to explain the present disclosure more fully to those skilled in the art.

A bioreactor for treating sewage and a sewage treatment system of the present disclosure will be described with reference to the drawings.

FIG. 1 schematically illustrates a structure of a bioreactor for treating sewage according to an embodiment of the present disclosure. In FIG. 1, the bioreactor 20 comprises an aerobic tank 21 for allowing organic substance contained in the sewage to be adsorbed on activated sludge, a backwashing cartridge filter 24 for separating sludge on which the organic substance is adsorbed, and an anaerobic tank 25 for a denitrification process.

More specifically, the bioreactor 20 for treating sewage comprises the aerobic tank 21 including an inlet for supplying sewage, a mixing cell 22 for receiving the sewage and mixing the sewage with activated sludge, the aerobic reactor tank 23 continuously coupled to the mixing cell 22, in which the activated sludge adsorbs organic substance, and an outlet for discharging sewage containing organic substance adsorbed on the activated sludge in the aerobic reactor tank 23.

The bioreactor 20 additionally comprises the backwashing cartridge filter 24 for separating sludge which has adsorbed the organic substance from the sewage discharged through the outlet of the aerobic tank, and the anaerobic tank 25 for carrying out a denitrification process for denitrifying the treated water, which has passed through the separation membrane bioreactor (MBR), using anaerobic ammonium oxidation (anammox) bacteria.

In this embodiment of the present disclosure, the sewage to be treated is supplied through the inlet of the bioreactor 20, and then the activated sludge is mixed with the sewage. Then, the activated sludge reacts with the sewage so that the organic substance contained in the sewage is adsorbed on the activated sludge. The activated sludge comprises at least one selected from the group consisting of ammonia-oxidizing archaea (AOA), ammonia-oxidizing bacteria (AOB) and nitrite-oxidizing bacteria (NOB), and adsorbs the organic substance.

Further, in this embodiment of the present disclosure, the mixing cell 22 may further comprise at least one agitator to facilitate the process for mixing the sewage and the activated sludge.

In this embodiment of the present disclosure, the agitator is not particularly limited in its configuration but may be of an impeller type with blades. In this case, the impeller type agitator is not particularly limited. However, according to a preferred embodiment of the present disclosure, the impeller type agitator may be formed in a manner that an outer blade portion is bent a downward direction of an inner blade portion such that water is pushed out to the desired direction. As a result, the agitator may collect and push out the water strongly, thereby maximizing agitation effect.

If the present disclosure adopts a plurality of agitators, blades of the plurality of agitators may have the same or different diameters. Preferably, arranging the plurality of agitators having different blade diameters such that the diameters are reduced gradually from an upper portion of a chamber to a lower portion of the chamber may make it possible to maintain a much faster mixing speed while allowing inflow water to flow from the upper portion to the lower portion of the chamber.

In this case, the number of revolutions (G-value) of the blade of the agitator is not particularly limited and may be appropriately selected depending on scale of mixing and agglomeration or size of the chamber. Preferably, it may be 30 to 110 sec$^{-1}$.

This embodiment of the present disclosure may further comprise an air injection unit 26 of FIG. 5 at a lower end of the aerobic reactor tank 23 so that adsorption of the organic substance contained in the sewage on the activated sludge in the aerobic reactor tank 23 can be facilitated.

Further, in this embodiment of the present disclosure, an auxiliary agent may be further added together with the activated sludge, where the auxiliary agent may be selected from the group consisting of clay, calcium hydroxide, cation flocculant, anionic flocculant and non-ion flocculant.

In this embodiment of the present disclosure, when the organic substance contained in the sewage as described above is grown into floc 110 in the aerobic reactor tank 23, the sewage treated as described above is supplied to the backwashing cartridge filter 24 connected to the aerobic reactor tank 23. The activated sludge on which the organic substance contained in the sewage has been adsorbed cannot pass through the cartridge filter 100 within the backwashing cartridge filter 24, and may remain as solid sludge. Accordingly, in this embodiment of the present disclosure, the sewage containing the floc 110 can be separated into the solid sludge and liquid sewage primarily treated through the backwashing cartridge filter 24.

In this embodiment of the present disclosure, the backwashing cartridge filter 24 comprises a cartridge filter housing 200, a cartridge filter 100 fixedly installed inside the cartridge filter housing to separate the sludge which has adsorbed the organic substance, a transfer port 300 arranged at an upper end of the cartridge filter to allow the treated water having been passed through the cartridge filter to be discharged therethrough, and an inlet 400 arranged at a lower end of the cartridge filter to allow the washing water for removing the sludge, which has not \passed through the cartridge filter, to be introduced therethrough.

In this embodiment of the present disclosure, the cartridge filter may comprise a large number of pores having a diameter of 50 to 150 μm. Since the cartridge filter comprises a large number of fine-sized pores, the floc 110 having diameters exceeding 150 μm cannot pass through the cartridge filter, whereas only the treated water passes through the cartridge filter and is introduced into the cartridge filter. The primarily treated water introduced as mentioned above can be transferred to the anaerobic tank through the transfer port 300.

In this embodiment of the present disclosure, the backwashing cartridge filter 24 may be configured to remove the floc 110 adhered to the cartridge filter by injecting washing water thereto. In a conventional bioreactor in which the floc 110 is removed using a separation membrane, occlusion phenomenon of the membrane that foreign matter is adsorbed on the separation membrane may occur. In order to prevent the occlusion phenomenon, it has been necessary to remove the foreign matter adhered to the separation membrane using an air injection unit, or to replace the separation membrane with a new one. However, according to the present disclosure, since the backwashing cartridge filter 24 is utilized, it may be easy to remove the foreign matter adsorbed on the cartridge filter 24 by injecting the washing water through the inlet 400, and it may be possible to recycle the removed foreign matter by transferring it back to the aerobic tank 21. Further, it may be unnecessary to provide a separate air injection unit for cleaning the separation membrane. For this reason, in comparison with the conventional separation membrane bioreactor, consumption of electric power can be minimized and replacement cycle of the cartridge filter can be extended so that usage time can be prolonged.

When foreign matter adsorbed to the cartridge filter is removed using the washing water, it is possible to contemplate using external washing water. However, as shown in FIG. 4 of the present disclosure, it is possible to use the primarily treated water passing through the cartridge filter 24 as washing water by injecting it through the inlet 400.

In other words, since it is possible to use the primarily treated water as washing water by regulating flow of the primarily treated water and transferring it into the cartridge filter 24 through the inlet 400, no separate washing water is required.

Therefore, in addition to the way of injecting separate washing water into the inlet 400 to remove foreign matter from the cartridge filter 24, it is also possible to use the way of regulating flow of the primarily treated water and then injecting the primarily treated water through the inlet 400 to use it as washing water.

Since that no additional water is required when using the primarily treated water as washing water, the treatment cost can be reduced. Further, cleaning of the cartridge filter 24 may be selectively carried out depending on the degree of adsorption of foreign matter, thus enhancing production efficiency.

Further, in this embodiment of the present disclosure, the backwashing cartridge 24 may further comprise a sludge supply piping 130 for transferring the separated sludge to the aerobic tank 21 so that the separated solid sludge can be transferred back to the aerobic tank 21.

FIG. 2 schematically illustrates structure of a backwashing cartridge filter according to an embodiment of the present disclosure. The sewage water treated in the aerobic tank 21 contains floc resulting from growth of the activated sludge adsorbing organic substance. In order to treat this floc 110, the floe is forced to pass through the cartridge filter 100. Due to the point that diameters of pores of the cartridge filter are smaller than the size of the floc 100, the floc 110 cannot pass through the cartridge filter and thus it is separated. The separated floc 110 remain outside the cartridge filter while the treated water flowed through the cartridge filter is transferred to the anaerobic tank 25, so that the sewage treatment process proceeds.

When the sewage treatment process is repeatedly carried out, the outer surface of the cartridge filter 100 is in a state that a large number of the floc 110 is adsorbed thereto. In this regard, occulusion phenomenon of the cartridge filter 100 of the present disclosure may also occur like the conventional separation membrane bioreactor. In order to prevent this problem, the backwashing cartridge filter 24 of the present disclosure further comprises the inlet 400 for introducing wash water into it. The washing water is injected through the inlet 400 and forced to pass through the cartridge filter from inside to outside of the cartridge filter. At this time, as the washing water passes through the cartridge filter from inside to outside of the cartridge filter, the floc 110 adsorbed on the outside of the membrane can be removed by the washing water. In other words, the floc 110 can be separated and removed in accordance with flow direction of the treated water and the washing water 130 passing through the cartridge filter. The floc 110 separated by the washing water 130 will remain inside the cartridge filter housing 200 and will be recovered and transferred back to the aerobic tank 21 for reuse.

As shown in FIG. 5, the sewage is treated in a primary sedimentation tank 10 where raw sludge is settled and liquid sewage is separated, and then the separated sewage water is transferred to the bioreactor 20 where processes of removal of organic substance and denitrification are carried out by forcing the separated sewage water to pass through the aerobic tank 21, the separation membrane bioreactor 24, and the anaerobic tank 25 in the bioreactor 20.

The bioreactor 20 is same as that shown in FIG. 1 and thus detailed description thereof is omitted herein.

The secondarily treated water from which nitrogen has been removed in the anaerobic tank 25 stays in a secondary sedimentation tank 30 where surplus sludge is settled, removed, and then discharged after passing through a disinfection process.

The raw sludge and the surplus sludge which are settled and separated in the primary and secondary sedimentation tanks are transferred to a dehydration tank 40 where they are subjected to a dehydration process. The concentrated sludge after the dehydration process is transferred to a digestion tank 50.

In the digestion tank 50 of this embodiment of the present disclosure, the surplus sludge and the raw sludge may be subjected to an anaerobic digestion process using anaerobic microorganisms.

Here, the anaerobic digestion process is also referred to as "methane fermentation." It is a series of processes for converting organic substance contained in the surplus sludge into methane by decomposition of various anaerobic microorganisms. More specifically, the anaerobic digestion process proceeds by passing through a process of liquefying solid organic substance and hydrolyzing it, a process of generating lower grade fatty acid (e.g., volatile organic acid: VFA) that generates vinegar acid, propionic acid and butyric acid, a process of decomposing the lower grade fatty acid into vinegar acid and $H_2$ gas and a process of generating methane using those products.

The digestion tank 50 of the present disclosure makes it possible to recover energy in the form of biogas such as methane simultaneously with treatment of the concentrated sludge. Therefore, in this embodiment of the present disclosure, the system may further comprise a biogas collector (not shown) for collecting biogas generated in the digestion tank 50 and, if necessary, further comprise a biogas separation membrane for separating methane and carbon dioxide contained in biogas.

In the present disclosure, when the anaerobic digestion process is carried out in the digestion tank 50, digested sludge and supernatant that cannot be recycled any more are generated. The digested sludge may be discarded, whereas the supernatant may be supplied to an SBR reaction tank 60.

The SBR reaction tank 60 refers to a sequential batch reactor which utilizes a continuous batch type activated sludge process. In the conventional SBR process, functions of a reaction tank and a secondary clarifier are provided in a single batch tank and processes for reaction and sedimentation of the mixed solution, drainage of supernatant water and discharge of the settled sludge are repeatedly carried out.

In the case of the conventional sewage treatment system, after the anaerobic digestion process is carried out using the concentrated sludge in the digestion tank 50, the generated supernatant liquid is transferred back to the primary sedimentation tank where it is reprocessed. However, in this case, since the supernatant liquid generated in the digestion tank 50 contains $NH^{4+}$ or $NO^{2-}$, if the sewage treatment is carried out in the continuous process, concentration of nitrogen increases continuously and thus concentration of C (carbon)/N (Nitrogen) exceeds 1 in the bioreactor 20, which ultimately causes a problem that energy production efficiency in the digestion tank 50 is lowered significantly.

In the present disclosure, in order to prevent the above mentioned problem, the supernatant liquid generated in the digestion tank 50 is transferred to the SBR reaction tank 60 to react with anaerobic ammonium oxidation (Anammox) bacteria so that $NH^{4+}$ and $NO^{2-}$ contained in the supernatant liquid are converted into $N_2$ and then nitrogen can be removed.

In this embodiment of the present disclosure, the anaerobic ammonium oxidation bacteria may be Planctomycetes. In general, AOB bacteria used as the activated sludge in the bioreactor 20 can convert about 50% of $NH^{4+}$ into $NO^{2-}$, but Planctomycetes used in the SBR reaction tank 60 of the present disclosure can convert whole of $NH^{4+}$ and $NO^{2-}$ into $N_2$. Further, in the present disclosure, the Planctomycetes are adsorbed to the surrounding organic substance and, as a result of that, floc (or granule) is formed where the floc can be selectively separated depending its particle size in the backwashing cartridge filter 62, as described below, since particle size of the floc may be relatively large compared to AOA, AOB and NOB bacteria.

In the present disclosure, although the sewage treatment process is carried out by transferring to the primary sedimentation tank 10 the final treated water generated in the SBR reaction tank 60 after nitrogen contained in the supernatant liquid in the SBR reaction tank 60 is removed as described above, energy production efficiency can be maintained even in a continuous process for sewage treatment since ratio of C/N in the bioreactor 20 can be maintained at less than or equal to 1.

Reference is now made to FIG. 5 which schematically illustrates structure of a sewage treatment system according to an embodiment of the present disclosure. Specifically, the SBR reaction tank 60 in this embodiment of the present disclosure comprises a treatment tank 61 and a backwashing cartridge filter 62.

In this embodiment of the present disclosure, the supernatant liquid transferred to the SBR reaction tank 60 may be contained in the treatment tank 61. In addition, in this embodiment of the present disclosure, the backwashing cartridge filter 62 comprises a cartridge filter and a detailed description thereof is omitted because it is the same as that provided with reference to FIGS. 2 to 4.

In the present disclosure, the supernatant liquid transferred to the treatment tank 61 is anaerobically digested by the anaerobic ammonium oxidation bacteria and, as a result of that, floc is formed.

In the present disclosure, since a large number of pores included in the cartridge filter are controlled to have a diameter of 50 to 150 μm, the floc cannot pass through a separation membrane module, whereas bacteria such as AOA, AOB and NOB in the activated sludge within the bioreactor 20 can again pass through the cartridge filter.

Further, in the present disclosure, the supernatant liquid purified as above and bacteria such as AOA, AOB, and NOB contained therein may be separately recovered and supplied back to the primary sedimentation tank 10 through a treated water feedback piping 64.

More specifically, anaerobic digestion reaction of the supernatant liquid by the anaerobic ammonium oxidation bacteria occurs in the treatment tank 61 of the SBR reaction tank 60, the supernatant liquid purified by the anaerobic digestion reaction is transferred to a treated water reservoir 63, and then the bacteria such as AOA, AOB and NOB and the floc generated by the anaerobic ammonium oxidation bacteria can be separated using the backwashing cartridge filter 62. In other words, the floc cannot pass through the cartridge filter of the backwashing cartridge filter 62, whereas bacteria such as AOA, AOB and NOB again pass through the cartridge filter, the purified supernatant liquid containing the bacteria, having been passed through the cartridge filter, is supplied back to the primary sedimentation tank 10 through the treated water feedback piping 64, and the flock is transferred to the treatment tank 61 of the SBR reaction tank 60 through a floc transfer piping 65.

The present disclosure has been described in detail with reference to specific embodiments. The embodiments are provided by way of example only in order to facilitate understanding of the present disclosure, but the scope of the present disclosure should not be limited thereto.

What is claimed is:

1. A bioreactor for treating sewage comprising:
    an aerobic tank configured to receive sewage, mix the sewage with activated sludge, adsorb organic substance existing in the sewage on the activated sludge, and discharge sewage containing organic substance adsorbed on the activated sludge;
    a device configured to separate sludge on which the organic substance is adsorbed from the sewage discharged from the aerobic tank; and
    an anaerobic tank configured to carry out a denitrification process for denitrifying treated water using anaerobic ammonium oxidation (anammox) bacteria,
    wherein the device is a backwashing cartridge filter configured to remove floe resulting from growth of the activated sludge adsorbing the organic substance.

2. The bioreactor according to claim 1, wherein the backwashing cartridge filter passes the sewage discharged from the aerobic tank through the cartridge filter and separates the floc and the treated water using difference in size between the floc contained in the sewage and pores in the cartridge filter.

3. The bioreactor according to claim 2, wherein the backwashing cartridge filter comprises:
    a cartridge filter housing;
    a cartridge filter fixedly installed inside the cartridge filter housing to separate the floc and the treated water;
    a transfer port arranged at an upper or lower end of the cartridge filter to allow the treated water flowed through the cartridge filter to be discharged therethrough; and
    an inlet arranged at an upper or lower end of the cartridge filter to allow the washing water for removing the floc not having been passed through the cartridge filter to be introduced therethrough.

4. The bioreactor according to claim 3, wherein the backwashing cartridge filter comprises a large number of pores having a diameter of 50 to 150 μm.

5. The bioreactor according to claim 3, wherein the backwashing cartridge filter further comprises a sludge supply piping configured to transfer the separated floc to the aerobic tank.

6. The bioreactor according to claim 1, wherein the aerobic tank comprises:
    an inlet configured to supply the sewage;
    a mixing cell configured to receive the sewage and mix the sewage with the activated sludge;
    an aerobic reactor tank coupled to the mixing cell, in which the activated sludge adsorbs the organic substance; and
    an outlet configured to discharge sewage containing organic substance adsorbed on the activated sludge in the aerobic reactor tank.

7. The bioreactor according to claim 6, wherein the mixing cell comprises at least one agitator to facilitate the denitrification process for mixing the sewage and the activated sludge.

8. The bioreactor according to claim 7, wherein the agitator is of an impeller type with blades configured to be formed in a manner that an outer blade portion is bent a downward direction of an inner blade portion such that water is pushed out to a desired direction.

9. The bioreactor according to claim 8, wherein the mixing cell comprises a plurality of agitators having different blade diameters and arranges the plurality of agitators having different blade diameters such that diameters are reduced gradually from an upper portion of the mixing cell to a lower portion of the mixing cell.

10. The bioreactor according to claim 6, wherein the aerobic reactor tank further comprises an air injector configured to inject air to allow the organic substance in the sewage water to be adsorbed on the activated sludge.

11. The bioreactor according to claim 1, wherein the activated sludge comprises one selected from the group consisting of ammonia-oxidizing archaea (AOA), ammonia-oxidizing bacteria (AOB) and nitrite-oxidizing bacteria (NOB).

12. The bioreactor according to claim 11, wherein an auxiliary agent is added together with the activated sludge, the auxiliary agent being selected from the group consisting of clay, calcium hydroxide, cation flocculant, anionic flocculant and non-ion flocculant.

13. The bioreactor according to claim 1, wherein the device is a separation membrane bioreactor (MBR) configured to separate the activated sludge adsorbing the organic substance from the sewage discharged from the aerobic tank.

14. A sewage treatment system comprising:
    a primary sedimentation tank configured to sediment sewage containing sludge to separate the sewage into raw sludge and settled sewage water;
    a bioreactor comprising:
        an aerobic tank configured to receive sewage supplied from an inlet, mix the sewage with activated sludge in a mixing cell, adsorb organic substance existing in the sewage on the activated sludge in an aerobic reactor tank, and discharge sewage containing organic substance adsorbed on the activated sludge through an outlet;
        a device configured to separate sludge on which the organic substance is adsorbed from the sewage discharged from the aerobic tank; and
        an anaerobic tank configured to carry out a denitrification process for denitrifying treated water using anaerobic ammonium oxidation (anammox) bacteria, wherein the bioreactor adsorbs organic substance in the settled sewage water separated in the primary sedimentation tank on the activated sludge such that the organic substance is separated out of the settled sewage water and carries out the denitrification process;

a secondary sedimentation tank configured to sediment surplus sludge in the settled sewage water, on which the organic substance has adsorbed in the aerobic tank of the bioreactor;

a dehydration tank configured to dehydrate the raw sludge recovered by being sedimented in the primary sedimentation tank and the surplus sludge recovered by being sedimented in the secondary sedimentation tank;

a digestion tank configured to anaerobically digest the raw sludge and the surplus sludge dehydrated in the dehydration tank to produce biogas; and a sequential batch reactor (SBR) reaction tank configured to remove nitrogen by allowing supernatant containing ammonium generated in the digestion tank to react with anaerobic ammonium oxidation (anammox) bacteria.

15. The sewage treatment system according to claim 14, wherein the device of the bioreactor is a backwashing cartridge filter configured to remove floc resulting from growth of the activated sludge adsorbing the organic substance, and wherein the backwashing cartridge filter comprises:

a cartridge filter housing;

a cartridge filter fixedly installed inside the cartridge filter housing to separate the floc and the treated water;

a transfer port arranged at an upper or lower end of the cartridge filter to allow the treated water having been passed through the cartridge filter to be discharged therethrough; and an inlet arranged at a lower or upper end of the cartridge filter to allow the washing water for removing the floc not having been passed through the cartridge filter to be introduced therethrough.

16. The sewage treatment system according to claim 15, wherein the activated sludge comprises one selected from the group consisting of ammonia-oxidizing archaea (AOA), ammonia-oxidizing bacteria (AOB) and nitrite-oxidizing bacteria (NOB).

17. The sewage treatment system according to claim 14, wherein the anaerobic ammonium oxidation (anammox) bacteria is Planctomycetes (Brocadia, Kuenenia, Anammoxoglobus, Jettenia and Scalindua including heterotrophic bacteria).

18. The sewage treatment system according to claim 14, wherein the SBR reaction tank is connected to a treated water reservoir, and the treated water reservoir comprises a backwashing cartridge filter configured to selectively separate the activated sludge.

19. The sewage treatment system according to claim 14, further comprising a biogas collector for collecting the biogas generated in the digestion tank.

* * * * *